Nov. 18, 1941.  C. R. RANEY ET AL  2,262,906
HARVESTER-THRESHER
Filed Sept. 25, 1940   2 Sheets-Sheet 2
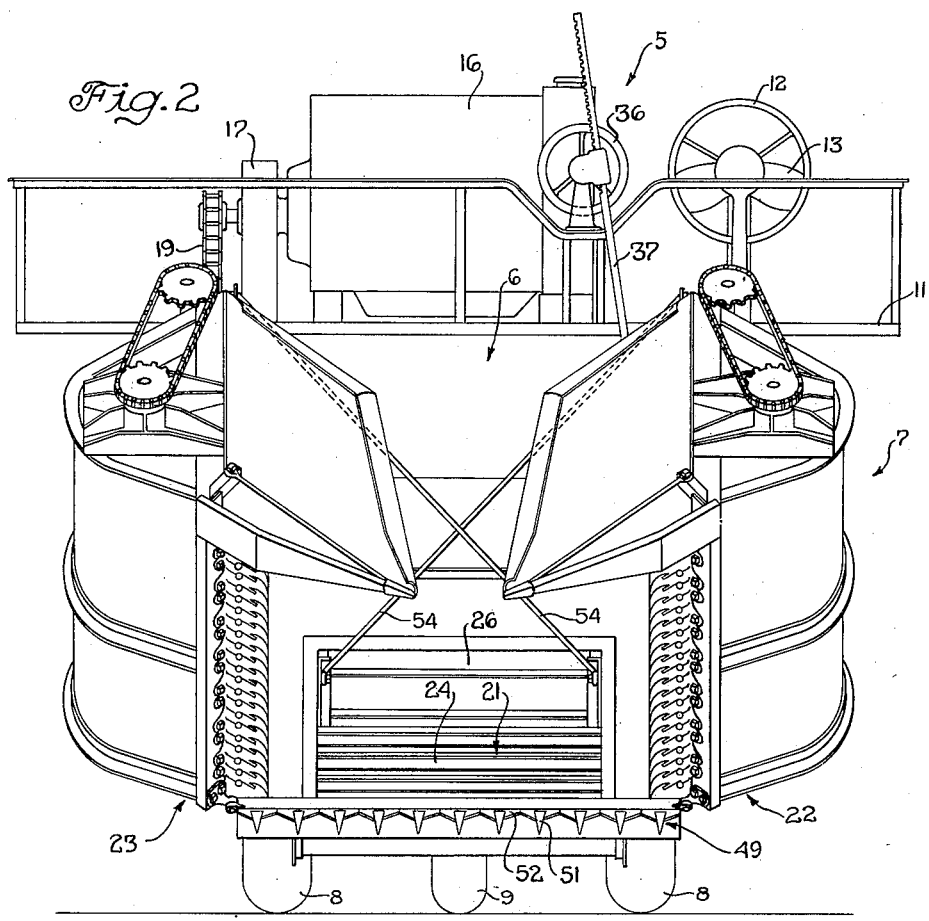
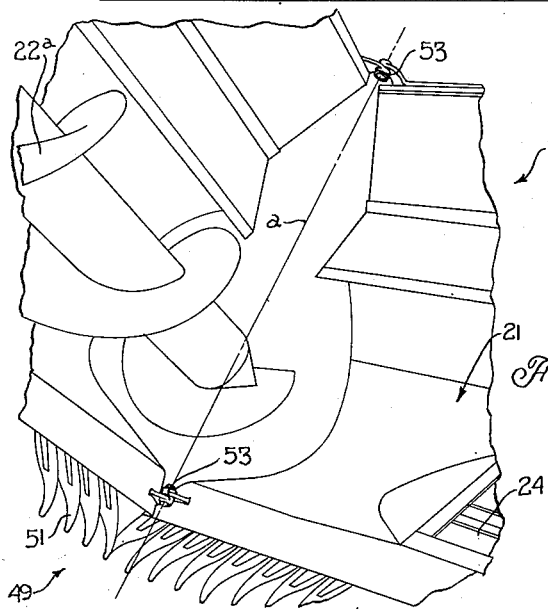
Inventors
Clemma R. Raney
Melville J. Mitchell
By Paueo Pippel
Att'y.

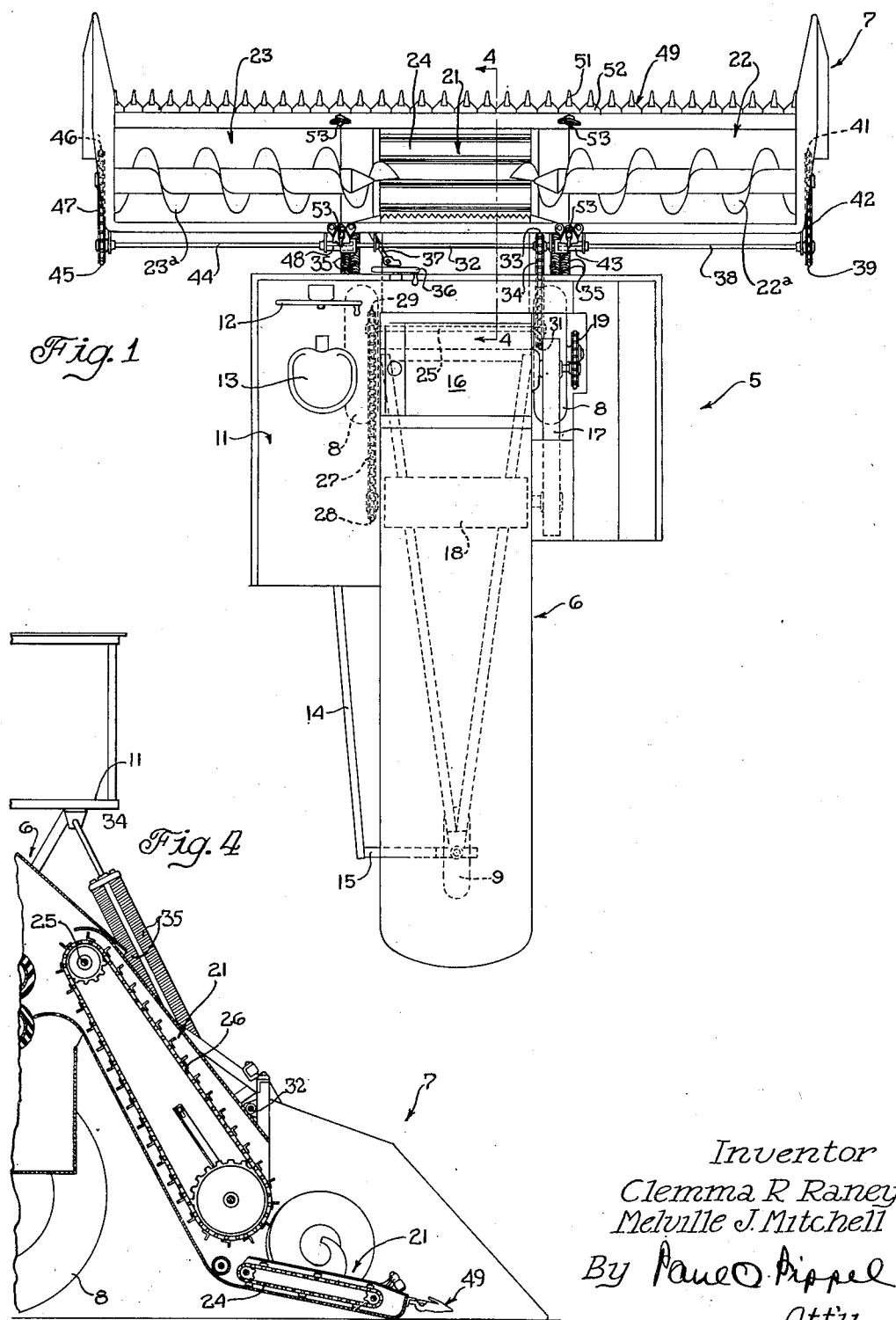

Patented Nov. 18, 1941

2,262,906

UNITED STATES PATENT OFFICE 2,262,906

HARVESTER-THRESHER

Clemma R. Raney, Riverside, and Melville J. Mitchell, Highland Park, Ill., assignors to International Harvester Company, a corporation of New Jersey Application September 25, 1940, Serial No. 358,254

6 Claims. (Cl. 56—122)

This invention relates to a harvester thresher of the self-propelled type in which a platform is provided at the front of the separator and extends laterally to each side thereof.

In a harvester thresher of this type, the platform extends laterally beyond the wheel tread of the thresher, and it is extremely difficult to transport the machine.

It is an important object of the invention to provide a self-propelled harvester thresher which may be readily transported.

Another object of the invention is to provide a platform for a self-propelled harvester which is so constructed that it may be folded at its ends, so that the width of the platform may be decreased for transporting the thresher.

These and other objects and advantages of the present invention will be apparent to those skilled in the art after a consideration of the following detailed description of the preferred structural embodiment, taken in conjunction with the accompanying drawings.

In the drawings:

Figure 1 is a top view of the self-propelled harvester thresher embodying the features of the present invention;

Figure 2 is a front view of the self-propelled harvester thresher showing the ends of the platform in their folded position;

Figure 3 is a perspective view of the platform showing the hinge connection therein; and, Figure 4 is a sectional view taken along the line 4—4 of Figure 1.

Referring now to the drawings, more particularly to Figure 1, it will be seen that the harvester thresher 5 is of the self-propelled type and comprises a separator 6 and a platform 7. The separator 6 is supported on a pair of front wheels 8, and a rear steerable wheel 9.

Above the separator 6 is mounted an operator's platform 11 on which is provided a steering wheel 12, and an operator's seat 13. A rod 14 extends rearwardly from the steering wheel 12 and is connected to an arm 15 provided on the steerable wheel 9, so that the harvester may be steered from the operator's platform 11.

Any suitable type of motor 16 may be mounted on the separator 6, or on the operator's platform 11, so as to drive the wheels 8 and the operating parts of the thresher.

As shown in Figure 1, a belt 17 is trained around a pulley provided on the motor 16 and a pulley provided at the end of the cylinder 18. A chain 19 is trained around a suitable sprocket provided on the motor 16 and is associated with the wheels 8 so as to drive the same.

The platform 7 consists of a central portion 21, a right-hand portion 22, and a left-hand portion 23. The central portion 21 is provided with a longitudinally disposed conveyor 24 which extends rearwardly. The central portion 21 of the platform 7 is pivotally mounted on a shaft 25 which is journaled on the front of the separator 6. As shown in Figure 4, the central portion 21 is provided with an under-shot conveyor 26 that conveys the grain from the conveyor 24 rearwardly and upwardly into the cylinder 18.

On the right-hand portion 22 of the platform 7 is rotatably mounted an open end auger 22a, and on the left-hand portion 23 is rotatably mounted an open end auger 23a. The augers 22a and 23a are driven through a driving connection with the shaft 25.

Referring to Figure 1, it will be noted that a chain 27 is trained around a sprocket 28 provided at one end of the cylinder 18 and a sprocket 29 provided at one end of the shaft 25. At the other end of the shaft 25 a sprocket 31 is provided. On the central portion 21 is journaled a shaft 32 on which is provided a sprocket 33. A chain 34, trained around the sprocket 31 and the sprocket 33, drives the shaft 32.

The central portion 21 of the platform is counterbalanced by the springs 35, which are connected to the operator's platform 11 and the center portion 21, in front of the shaft 25. The platform 7 is adjusted by the hand wheel 36, from which extends a rod 37 that extends downwardly and is connected to the center portion 21.

The augers 22a and 23a are driven from the driven shaft 32. On the right hand portion 22 of the platform is mounted a shaft 44 at the outer end of which is provided a sprocket 39. A sprocket 41 is secured at the end of the auger 22a, and a chain 42 is trained around the sprockets 39 and 41. The inner end of the shaft 38 is releasably connected to the shaft 32 by a clutch mechanism 43. On the left-hand portion 23 of the platform is mounted a shaft 44 at the outer end of which is provided a sprocket 45. A sprocket 46 is secured to the end of the auger 23a, and a chain 47 is trained around the sprockets 39 and 41. The inner end of the shaft 44 is releasably connected to the shaft 32 by a clutch mechanism 48. The front edge of the platform 7 is provided with the usual cutting mechanism 49 which consists of finger guards 51, and a reciprocating sickle 52 that cuts the grain.

The right-hand portion 22 and the left-hand portion 23 of the platform 7 are each pivotally connected to the central portion 21 by hinges 53. As shown in Figure 3, one of the hinges is provided on the front part of the platform and the other hinge is provided at the rear of the platform 7. The hinges 53 are positioned on the front and rear of the platform so that their pivot axes are coaxial, as shown in Figure 3 by the line $a$ drawn through their respective axes.

When the harvester thresher is in operation, the platform 7 is in the position shown in Figure 1. That is, the platform 7 extends laterally to each side of the separator 6. The operator controls the thresher from his station 13 on the operator's platform 11. The cutting mechanism 49 cuts the grain, and the augers 22a and 23a convey the grain onto the longitudinally disposed elevator 24 from which the grain is conveyed by the under-shot conveyor 26 into the cylinder of the thresher.

When it is desired to transport the thresher, the outer ends of the platform are folded into the position shown in Figure 2. The reciprocating sickle 24 is removed. Since the augers 22a and 23a are of the open end type, they need not be disconnected from the platform. By "open end" is meant that the inner ends of the augers 22a and 23a are unencumbered by any shaft or other support, thus leaving a free space for communication with the conveyor 24, so that cut material is readily transferred from the augers to the conveyor 24. In other words, there is no shaft support for these augers spanning the conveyor 24. The hinges 53 are provided on the platform 7 in such a location that the open end of the auger will clear the outer ends of the central portion 21. The clutch mechanisms 43 and 48 disengage when the right-hand and left-hand portions 22 and 23 of the platform are folded. The portions 22 and 23 of the platform are held in their folded position by brace rods 54 which, in the present case, are connected to the central portion 21 and the outer ends of the portions 22 and 23.

Viewing the harvester from the front, as shown in Figure 2, it is apparent that the width of the thresher is considerably less when the platform is folded. The harvester, by this folding platform construction, may be readily transported at its reduced width. The platform may be quickly folded since only the reciprocating sickle 24 and the reel, if used, need be removed from the platform.

While only a preferred construction embodying the principles of the present invention has been shown and described, it is to be understood that the invention is not to be limited to the specific details shown and described, but that, in fact, widely different means may be employed in the practice of the broader aspects of the invention.

What is claimed is:

1. A harvester thresher comprising a wheel supported separator, a platform pivotally mounted at the front of the separator and having opposite end portions respectively extending laterally to each side thereof, and hinge means provided in the platform at each side of the separator for folding the end portions of the platform upwardly toward one another to reduce the length thereof.

2. A self-propelled harvester thresher comprising a wheel supported separator, a platform pivotally mounted at the front end of the separator and extending laterally to each side of the separator, a longitudinally extending conveyor on the platform extending into the separator, and an open end auger mounted on the platform at each side of the longitudinally extending conveyor.

3. A self-propelled harvester thresher comprising a wheel supported separator, a platform associated with the front of the separator and extending laterally to each side thereof, said platform comprising a central portion in which there is provided a longitudinal conveyor and a right-hand portion on which there is rotatably mounted an open end auger and a left-hand portion in which there is rotatably mounted an open end auger, and hinge means connecting the right-hand portion to the central portion and the left-hand portion to the central portion.

4. A self-propelled harvester thresher comprising a wheel supported separator, a platform associated with the front of the separator and extending laterally to each side thereof, said platform comprising a central portion in which there is provided a longitudinal conveyor and a right-hand portion on which there is rotatably mounted an open end auger and a left-hand portion on which there is rotatably mounted an open end auger, and hinge means connecting the right-hand portion and left-hand portion to the central portion in such a manner that the right- and left-hand portions may be folded upwardly toward one another to narrow the width of the platform, and means for holding the ends of the platform in their raised position.

5. In a self-propelled harvester thresher having a wheel supported separator, a platform pivotally mounted on the front of the separator and extending laterally to each side thereof, a longitudinally arranged conveying means on the platform and extending rearwardly into the separator, and rotatably mounted open end augers mounted at each end of the platform and adapted to convey material onto the longitudinally arranged conveying means.

6. In a harvester thresher having a separator, a platform pivotally mounted on the front of the separator and extending laterally to each side thereof, a longitudinal feeder extending rearwardly from the platform and into the separator, and an auger conveyor mounted at each end of the platform and terminating short of the longitudinal conveyor.

CLEMMA R. RANEY.
MELVILLE J. MITCHELL.